United States Patent [19]
Roehr

[11] Patent Number: 5,784,002
[45] Date of Patent: Jul. 21, 1998

[54] LOW-POWER RANDOM DIGIT GENERATOR

[75] Inventor: Walter Roehr, Reston, Va.

[73] Assignee: Mobile Telecommunication Technologies, Jackson, Miss.

[21] Appl. No.: 434,349

[22] Filed: May 2, 1995

[51] Int. Cl.$^6$ ............................................. H04Q 7/00
[52] U.S. Cl. .................. 340/825.5; 370/455; 370/461; 370/462; 370/463; 370/442; 370/444; 370/431
[58] Field of Search ................... 340/825.5; 370/85.2, 370/85.3, 85.6, 84, 442, 447, 445, 444, 455, 461–3, 431

[56] References Cited

U.S. PATENT DOCUMENTS

| | | | |
|---|---|---|---|
| 4,063,220 | 12/1977 | Metcalfe et al. | 340/147 LP |
| 4,539,518 | 9/1985 | Kitayoshi | 324/77 B |
| 4,608,559 | 8/1986 | Friedman et al. | 340/825.5 |
| 4,688,213 | 8/1987 | Raychaudhuri | 370/93 |
| 5,491,741 | 2/1996 | Farwell et al. | 379/59 |

*Primary Examiner*—Michael Horabik
*Assistant Examiner*—Yonel Beaulieu
*Attorney, Agent, or Firm*—Finnegan, Henderson, Farabow, Garrett & Dunner, L.L.P.

[57] ABSTRACT

A low-power random digit generator for use with existing circuitry samples a changing physical variable. In a communications device, the random digit generator has an A/D converter that repetitively converts a received analog signal at a conversion rate, where a magnitude of the received analog signal changes at a received rate. At least one bit from the conversion is selected, and a random digital signal having a magnitude corresponding to the at least one bit is generated. The communications device preferably taps off an existing A/D converter and uses combinational circuitry to minimize power consumption.

24 Claims, 4 Drawing Sheets

|  | ABLE TO SENSE OTHERS USING CHANNEL | NOT ABLE TO SENSE OTHERS USING CHANNEL |
|---|---|---|
| TYPES OF ACCESS | CARRIER SENSE BUSY TONE | ALOHA SLOTTED ALOHA (FIXED MESSAGE SLOTS) |
| POSSIBLE TYPES OF ACTION | PERSISTENT---JUMP-IN IMMEDIATELY WHEN CHANNEL IS OPEN | TRANSMIT AT FIRST OPPORTUNITY AND WAIT FOR AN ACK SIGNAL |
|  | N-PERSISTENT---USE RANDOM DIGIT(s) TO DETERMINE WHETHER FOR THIS ACCESS ATTEMPT A GIVEN DEVICE WILL ACT PERSISTANT OR NON-PERSISTANT |  |
|  | NON-PERSISTENT --- WAIT A RANDOM TIME BEFORE TRYING AFTER CHANNEL OPENS |  |
| NEXT POSSIBLE TYPES OF ACTION | IF ACK RECEIVED, THEN TASK COMPLETE | IF ACK RECEIVED, THEN TASK COMPLETE |
|  | IF ACK NOT RECEIVED, THEN WAIT A RANDOM TIME BEFORE TRANSMITTING AGAIN | IF ACK NOT RECEIVED, THEN WAIT A RANDOM TIME BEFORE TRANSMITTING AGAIN |
| SUBSEQUENT POSSIBLE TYPES OF ACTION | PERFORM BACKOFF ALGORITHM AND TRANSMIT AGAIN | PERFORM BACKOFF ALGORITHM AND TRANSMIT AGAIN |
|  |  | WAIT A RANDOM TIME BEFORE TRANSMITTING AGAIN |

FIG. 1  (PRIOR ART)

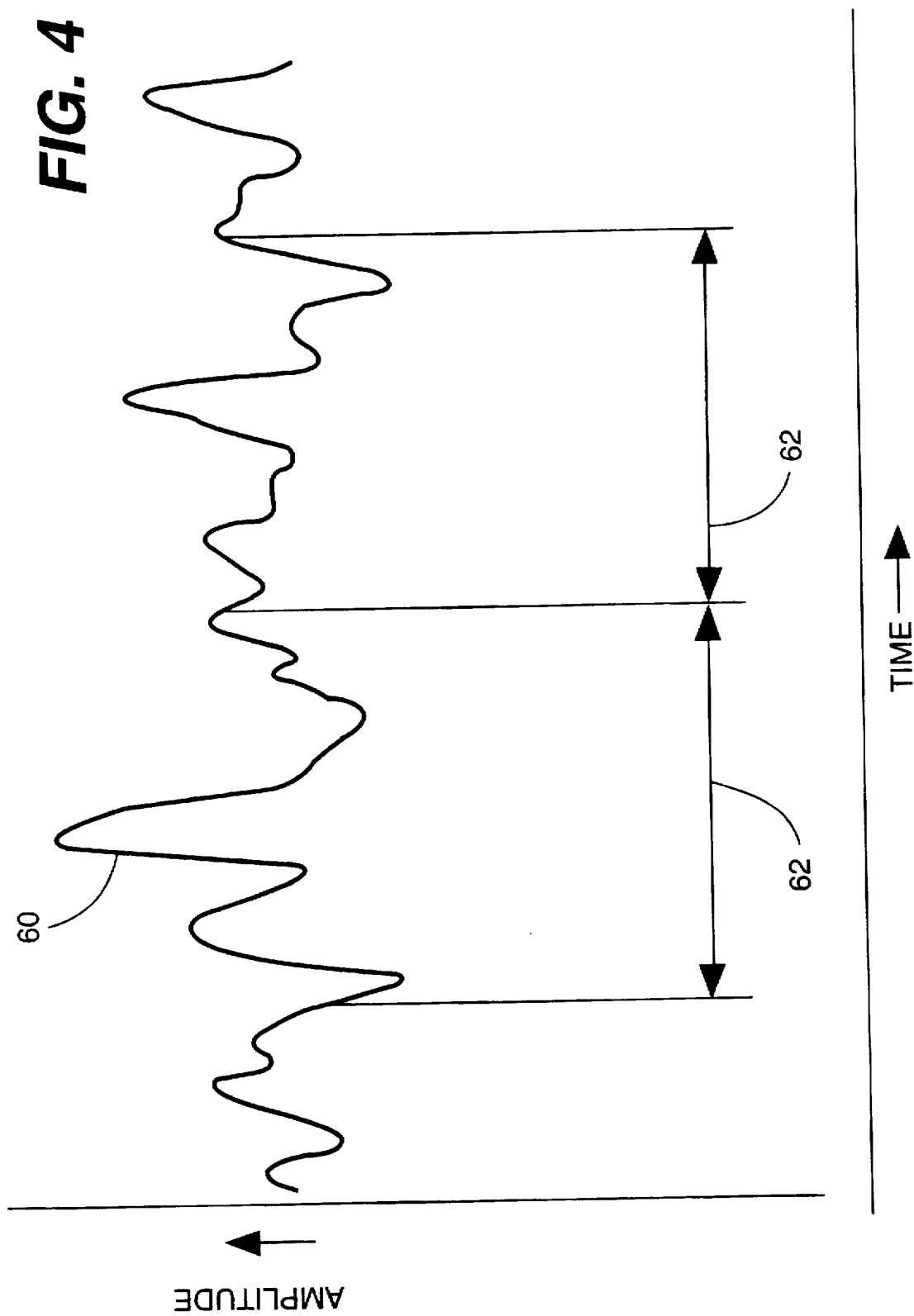

5,784,002

1
LOW-POWER RANDOM DIGIT GENERATOR

FIELD OF THE INVENTION

The present invention relates generally to low-power random digit generators, and more particularly to a low-power random digit generator for designating an access time to a communications media for a communications device.

DISCUSSION OF RELATED ART

A source of signals representing random digits or numbers is essential to many types of electronic systems. The unpredictability of the random signals permits an electronic system to perform unbiased logical comparisons or mathematical computations.

As one example, random digit generators may assist in arbitrating the use of a common bus or communications media by a plurality of accessing devices. Generally, accessing devices to a communications media operate independently of each other. Thus, more than one of the devices, such as a data terminal, computer, telephone or walkie-talkie, may attempt to access the media at the same time. In this event, an access collision or contention occurs.

A variety of contention-based access techniques (CBAT) have been developed and are being used. These techniques differ in their complexity, relative performance in heavy and light traffic situations, and their use of random digits. This brief description of these CBAT is given here to broadly indicate the range of possible applications for the present invention and is not intended to be exhaustive. Referring to FIG. 1, CBAT in general encompass two types: those where the device can sense that others are using the desired channel and those where the device cannot. In all CBAT, a random digit generator installed in each accessing device may help arbitrate contention for the media. This arrangement permits decentralized arbitration of communications media collisions.

For contending devices that can recognize when other devices are using a channel (such as Carrier Sense and Busy Tone), several possible actions may require random digits. If the channel is not busy when a device first attempts access, all members of this class immediately attempt transmission, without need for random digits. A further sub-division of these sensing modes occurs in the situation where the channel is sensed busy. A persistent response mode immediately accesses the channel when the channel becomes open and does not require random digit generation. A non-persistent response mode, however, causes the contending device to wait a random time period before attempting to access the channel again. The non-persistent mode seeks to avoid the guaranteed collision that will occur when two or more persistent mode devices are simultaneously waiting for a previous access to finish, and the non-persistent mode accepts the additional delay for all devices that results. An "n-persistent" response mode seeks to minimize the channel idle time by having, on average, one device act persistent and all other devices act non-persistent. The decision as to whether a given device will act persistent or non-persistent for a given access attempt is determined by using random digit(s). Thus, an n-persistent device is likely to consume two random numbers whenever it encounters a busy channel: one to determine whether it will act non-persistent; a second to determine the delay if it, in fact, does act non-persistent.

For contending devices that cannot recognize when other devices are using a channel (such as Aloha and Slotted

2

Aloha), the response mode may also require a random signal or value. These devices rely on an acknowledgment signal (ACK) to indicate that the transmission has been received. If the accessing device does not receive ACK after a predetermined time, then the device delays for a random time period from the original range before retransmitting. If the accessing device still does not receive an ACK signal, the device may select another random delay period from the original range or it may perform a back-off algorithm. The back-off algorithm will select a random delay length for the device from a range that is longer than the previous delay range used.

U.S. Pat. No. 4,063,220 issued to Metcalfe et al. describes an Ethernet system and an example of a CBAT. The patent discloses the use of a random digit generator for arbitrating collisions in a multi-point data communications system. The communications system disclosed in Metcalfe et al. includes numerous receiver-transmitter devices arranged in a network. These communicating devices, or transceivers, each attempt to transmit data through the communication network at selective times. A collision will occur if more than one transceiver accesses the communication network at the same time. If a transceiver detects a collision, that device aborts its transmission and waits for a predetermined random interval of time before retransmitting. To preclude simultaneous restarts by the colliding transceivers, each transceiver uses a separate random number generator to set a retransmission interval. Specifically, the transceiver devices may provide a weighted random number based on a history of transmission collisions for the device. In this way, a transceiver historically having a high number of collisions may receive a weighted random number having a longer time interval.

The random number generator described in Metcalfe et al. consumes considerable power, however. The Metcalfe et al. arrangement comprises an eight-bit counter driven by a continually-running high-speed clock. Moreover, the eight data outputs from the counter feed a series of logic circuits used to weight the selected random value. Thus, the Metcalfe et al. arrangement is undesirable in applications where power consumption must be minimized. In wireless communications devices, for example, power, which is often supplied to the electronics by a battery, is a premium. Often, the battery is the heaviest component in the communications device, and increased current requirements generally force the use of a larger and heavier battery. Thus, a random digit generator using additional circuitry and consuming a continuous flow of current is undesirable.

In light of the foregoing, there is a need for a random digit generator that consumes minimal power. A need exists for a random digit generator for allocating an access time to a communications media for a communications device while consuming minimal quantities of power and requiring few additional electronic devices.

SUMMARY OF THE INVENTION

Accordingly, the present invention is directed to a low-power random digit generator that substantially obviates one or more of the limitations and disadvantages of the described prior arrangements.

Additional advantages of the invention will be set forth in part in the description that follows, and in part will be apparent from the description, or may be learned by practice of the invention. The advantages of the invention will be realized and attained by means of the instrumentalities and combinations particularly pointed out in the written description and claims hereof as well as the appended drawings.

To achieve these and other advantages in accordance with the purpose of the invention, as embodied and broadly described herein, the invention provides a method for generating a random digital signal in a communications device, the communications device monitoring a communications media, comprising the steps of receiving, at the communications device, an analog signal from the communications media and converting repetitively in the communications device the received analog signal to a digital sample at a conversion rate. The method further comprises the steps of selecting at least one bit from the digital sample at a predetermined selection rate and generating a random digital signal having a magnitude corresponding to the at least one bit.

In another aspect, the invention provides a communications device for receiving and decoding an analog electromagnetic signal from a communications media, comprising a receiver, an A/D converter having an analog input and a digital output and converting the analog signal to a digital sample at a conversion rate, the analog input being coupled to the receiver. The communications device further comprises a random signal generator coupled to the digital output of the A/D converter, the random signal generator selecting at least one bit from the digital sample at a selection rate and generating a random digital signal having a magnitude corresponding to the at least one bit.

In another aspect, the invention provides a low-power random signal generator, comprising an A/D converter having an analog input and a digital output and converting repetitively a received analog signal to a digital sample at a conversion rate, a magnitude of the received analog signal changing at a received rate. The low-power random signal generator further comprises selection and generation means coupled to the digital output of the A/D converter for selecting at least one bit from the digital sample at a selection rate and generating a random digital signal having a magnitude corresponding to the at least one bit, the received rate and the conversion rate exceeding the selection rate.

It is understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate several embodiments of the invention and together with the description serve to explain the principles of the invention. In the drawings, FIG. 1 is a chart of the prior art contention-based accessing techniques for using the present invention;

FIG. 4 is a diagram of a waveform before demodulation in a communications media sampled according to an embodiment of the present invention.

DETAILED DESCRIPTION OF THE PREFERRED EMBODIMENTS

Reference will now be made in detail to the presently preferred embodiments of the invention, examples of which are illustrated in the accompanying drawings. Wherever possible, the same reference numbers will be used throughout the drawings to refer to the same or like parts.

Figure 2:
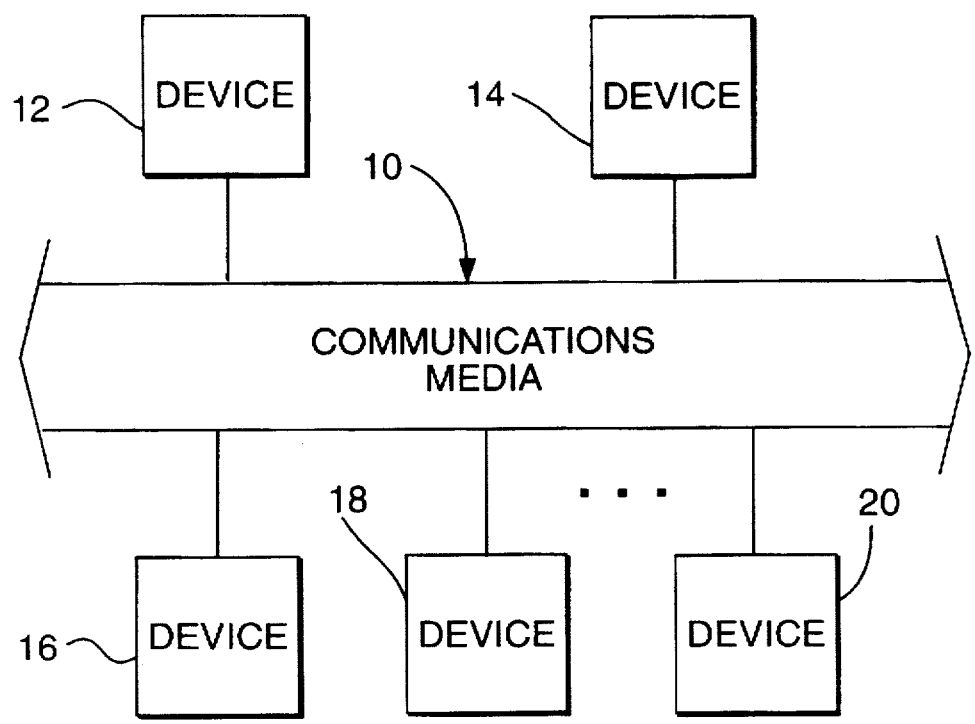
FIG. 2 is a block diagram of a communications media and a plurality of communications devices for using the present invention.

Referring to FIG. 2, a communications media 10 comprises a path for the transmission of electromagnetic signals. Communications media 10, for example, may be a wired private or public network, such as a local area network cable or the radio ether for paging and cellular technologies. Communications devices 12–20 are electrically coupled to the communications media 10, for instance by an antenna, a transmitter, and a receiver tuned to a predetermined frequency. Each communications device may independently receive and decode an electromagnetic signal from the communications media 10. As is commonly known in the art, communications devices 12–20 may comprise pagers, telephones, walkie-talkies, or computers, for example.

Figure 3:
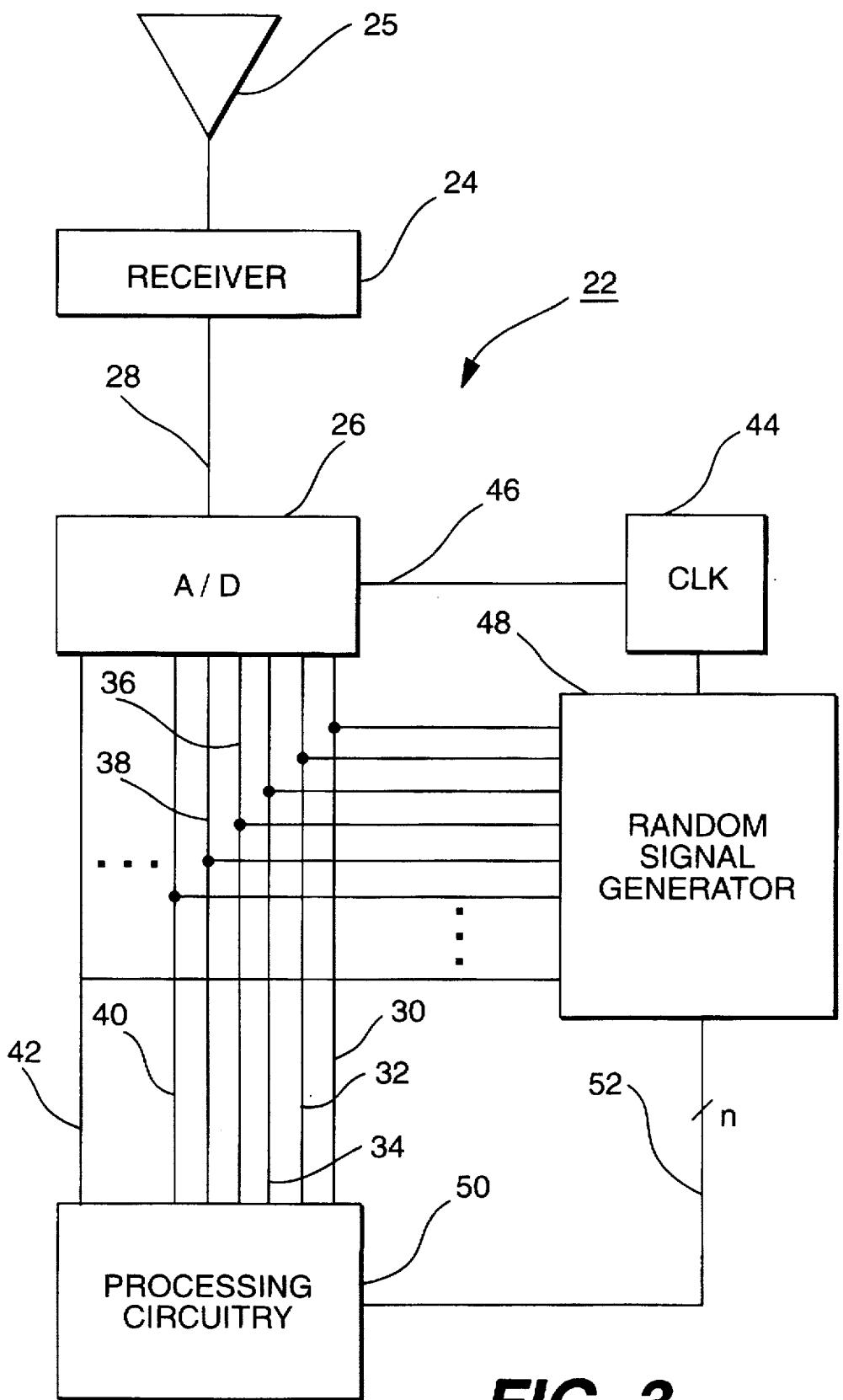
FIG. 3 is a schematic diagram according to an embodiment of the present invention.

The exemplary embodiment of the communications device of the present invention is shown in FIG. 3 and is designated generally by reference numeral 22. As embodied herein and shown in FIG. 3, a communications device for receiving and decoding an analog electromagnetic signal from a communications media 10 includes a receiver 24. The receiver 24 receives analog electromagnetic signals from communications media 10, either directly from a wired communications media or through the ether for a wireless communications media. For a wireless communications device such as a pager, receiver 24 may include an antenna 25 and other commonly-known devices for effectively receiving and identifying the electromagnetic signal from the communications media 10. A battery (not shown) may supply power to the communications device 22, permitting portability of the device.

The preferred communications device 22 of the present invention includes an analog-to-digital (A/D) converter 26. The A/D converter 26 has an analog input 28 coupled to the receiver 24. As is readily known, an A/D converter samples an analog input signal at a selected rate and converts the sampled analog signal to a multi-bit digital equivalent. As shown in FIG. 3, A/D converter 26 samples the electromagnetic signal at analog input 28 and generates digital outputs 30–42. As shown by the ellipses in FIG. 3, A/D converter 26 may have any number of digital output lines. Of course, more digital output lines will increase the resolution of the A/D conversion. A sampling clock 44 feeds a clock signal to the A/D converter 26 via clock line 46. The rate of the sampling clock 44 determines the sampling or conversion rate for the A/D converter 26.

The A/D converter 26 preferably is resident on the communications device. Many communications devices that receive and decode analog signals today include an A/D converter for enabling digital processing. To that end, output lines 30–42 of A/D converter 26 connect with processing circuitry 50 in FIG. 3. In accordance with the present invention, processing circuitry 50 may include a microprocessor-based control system that includes readily-known integrated circuits that assist a microprocessor in executing microcode. In a conventional wireless communications device, for example, the A/D converter 26 may be used to implement a modulation detection process that is completed in the processing circuitry 50 through the execution of select microcode. Examples of algorithms performed in the processing circuitry 50 include Fourier transforms, multiplication, and digital filtering, as required.

As embodied herein and again referring to FIG. 3, the communications device 22 for receiving and decoding an analog electromagnetic signal from a communications media 10 also includes a random signal generator 48 coupled to at least one of the digital outputs 30–42 of the A/D converter 26. The random signal generator 48 selects at least one bit from the outputs 30–42 of the A/D converter 26 and generates a random digital signal having a magnitude corresponding to the at least one bit. The random signal generator 48 selects the at least one bit periodically according to a predetermined selection rate.

In accordance with the present invention and as embodied herein, the random signal generator 48 of communications device 22 may comprise integrated circuitry having low power requirements. For instance, generator 48 may be simple logic gates that select and arrange the outputs of the A/D converter 26. Alternatively, random signal generator 48 may include a microprocessor-based control system that includes readily-known integrated circuits that assist a microprocessor in executing microcode. In this regard, random signal generator 48 may comprise a portion of processing circuitry 50 and be controlled by select microcode executed by a microprocessor or the like.

FIG. 4 depicts a received electromagnetic signal. As is commonly known, the received signal may comprise numerous waveforms prior to demodulation. The combination of these numerous waveforms may result in electromagnetic noise at receiver 24. In other words, the magnitude of the combined electromagnetic signal 60 received at receiver 24 will change unpredictably at a frequency, or received rate. At any given point in time, therefore, the magnitude of the signal 60 will be essentially random. As shown in FIG. 4, selected times for sampling the electromagnetic signal 60 are separated by a sampling period 62.

Alternatively, the receiver 24 may include filtering circuitry for selecting certain frequencies from the combined signal 24. Demodulation, for instance, will remove carrier components of the analog signal, revealing a lower frequency signal. As commonly-known in the communications field, transmission of messages in the analog signal may occur using symbols. The A/D converter 26 samples each symbol several times, and the processing circuitry 50 analyzes the digital results to obtain the transmitted message.

Figure 5:
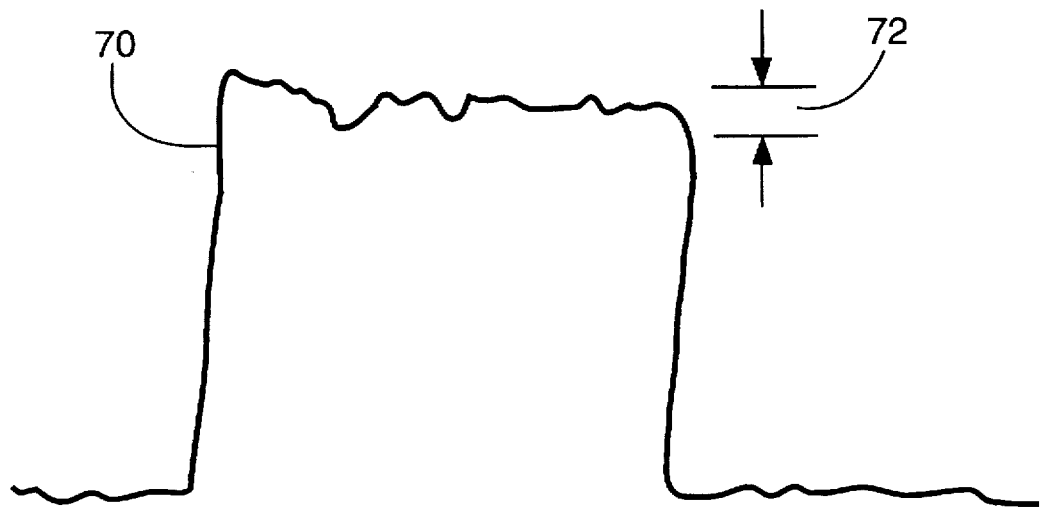
FIG. 5 is a diagram of a waveform after demodulation in a communications media sampled according to an embodiment of the present invention.

Referring to FIG. 5, a demodulated received signal 70 resembles a step function. Although the signal 70 itself is somewhat deterministic due to its step shape, the level of variation 72 within the signal is essentially random at any given time due to noise.

In accordance with the present invention, a received rate, or rate of change, of the analog electromagnetic signal exceeds the selection rate of the random signal generator 48. That is, the rate of change of the analog signal 60 exceeds the rate of selection from output lines 30–42 by the random signal generator 48. This rate of change refers to some magnitude variation in the received signal from sample to sample. As a result of these different rates of change, any selected digital sample will represent an essentially random value. In particular, high frequency noise will randomize the digital sample when the random signal generator 48 selects the least significant bit from the A/D converter 26.

The random signal generator 48 may process the selected at least one bit from the digital sample to derive other random digital values as well. In doing so, the random signal generator 48 may concatenate the at least one bit with bits from other digital samples. For example, the random signal generator 48 may derive a random digital value by selecting the value at digital output 30 from A/D converter 26. At the next selection time, the random signal generator 48 may again select the value from output 30 and concatenate this second selected value with the first selected value. As will be clear to one of ordinary skill in the art, this concatenation process performed by the random signal generator 48 may encompass a plurality of concatenations. Mathematical or logical operations in addition to concatenations may be adopted within the scope of the present invention.

As a further embodiment of the communications device 22 for receiving and decoding an analog electromagnetic signal from a communications media 10, the random signal generator 48 may select a plurality of bits from the A/D converter 26, such as digital outputs 30–36 or 30, 34, and 38. From this plurality of bits, the random signal generator may then allocate a least significant bit (output 30) as a most significant bit in a random digital signal. Thus, where the A/D converter 26 produces the least significant digits at output 30, the random signal generator may allocate the digit at output 30 as a most significant bit in a random digital value. The random signal generator 48 may also select a plurality of bits and perform various concatenations to achieve a random digital value.

An output line 52 feeds the resultant random signal to the processing circuitry 50. This line 52 may comprise a single line for serial transmission or n lines as required. The processing circuitry 50 may then apply the random digital signal as required. For instance, in one implementation, the processing circuitry 50 may allocate access times for the communications device 22 to the communications media 10. This access time may be used by a Carrier Sense, Busy Tone, Aloha, or Slotted Aloha CBAT, for example, as required.

The preferred embodiment is dependent upon the details of the system in which it is operating, i.e., the bandwidth of the received signal that is being digitized, the sample rate, the number of digits needed in the random number, and the random number usage rate. In a typical contention access arrangement, the bandwidth of the received signal is comparable to the symbol rate of the channel, and the sampling rate is a low multiple of the symbol rate (1 to 16 samples per symbol). The A/D converter in a typical arrangement produces 4 to 12 bits per sample, with the least significant 1 or 2 bits largely determined by random processes such as additive noise or random fading of the signal levels.

A typical communications device like a pager has ample time to collect or formulate random signals. Media access, which is the prime consumer of these random signals, occurs at the message generation rate. The exponential back-off process, popularized by Ethernet (U.S. Pat. No. 4,063,220), consumes a single bit at each access attempt. Since a typical message contains hundreds (if not thousands or tens of thousands) of symbols, the random signal generator 48 normally has an abundance of time for gathering random signals. Therefore, a typical application generally can collect just the least significant digit from the A/D converter 26 and from samples that are widely spaced in time (and therefore highly non-correlated). Even the value of the symbols themselves, if sampled at widely-spaced intervals that are not synchronized with the message generation and reception processes, will be essentially random and can be used as the basis for generating the random signal.

However, if a particular application consumes random numbers at a high rate, two or more of the least significant digits in adjacent samples may be sufficiently random to satisfy the application's requirements. If the random signal generator 48 requires more than one digit per sample, then the generator 48 should use the least significant digit from the A/D converter 26 for the most critical application—typically the most significant digit in a multi-digit number.

Thus, a preferred embodiment for a CBAT implementing exponential back-off is to select a single least significant bit from A/D converter 26, ideally at a time that is asynchronous with respect to the message generation and reception. The random signal generator 48 then stores the selected least significant bit in a register or memory location for use whenever random back-off is needed. When that stored bit is used, the random signal generator 48 stores another least significant bit at some, nominally asynchronous, later time. The generator 48 will use this renewed random bit sometime later either to extend the length of the current random number in accordance with the exponential back-off algorithm (when the access attempt fails), or to be used as the first bit of the next back-off process (when the access attempt succeeds).

As a result, the present invention provides a low-power random digit generator. Due to the use of combinational circuitry without an additional free-running clock or existing processing circuitry in the communications device, the device requires significantly less current to operate than prior arrangements. Consequently, the drain on a battery is significantly decreased, so that the life of the battery is lengthened.

Moreover, the preferred embodiment of the present invention yields significant advantages in its application to existing circuitry. By tapping off the outputs of an A/D converter that is already in use, the present invention minimizes the need for additional electrical components, decreasing cost and space and further decreasing power consumption. In particular, in those situations where the consumption of random digits is far less than the symbol rate in the channel, the detected symbols themselves will generally be an adequate source of random digits. For example, the processing circuitry in a conventional pager may be used for modulation detection as well as for the random digit generator of the present invention. Of course, electronic devices other than an A/D converter may be implemented to achieve the low-power random digit generator within the scope of this invention.

. It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

What is claimed is:

1. A method for generating a random digital signal in a communications device, the communications device monitoring a communications media, comprising the steps of:
   a. receiving, at the communications device, an analog signal from the communications media, a magnitude of the analog signal changing at a received rate;
   b. converting repetitively, in the communications device, the received analog signal to a digital sample at a conversion rate;
   c. selecting at least one bit from the digital sample at a predetermined selection rate; and
   d. generating a random digital signal having a magnitude corresponding to the at least one bit.

2. The method of claim 1, further comprising the step of delaying access to the communications media for the communications device by a time period corresponding to the random digital signal.

3. The method of claim 1, wherein the conversion rate exceeds the selection rate.

4. The method of claim 1, wherein the received rate exceeds the selection rate.

5. The method of claim 1, wherein the generating step includes designating the at least one bit as the magnitude of the random digital signal.

6. The method of claim 1, wherein the generating step includes concatenating the at least one bit with bits from a plurality of the digital samples.

7. The method of claim 6, wherein the concatenated bits are least significant bits of the plurality of the digital samples.

8. The method of claim 1, wherein the selecting step selects a least significant bit of the digital sample as the at least one bit.

9. The method of claim 1, wherein the selecting step selects a plurality of bits as the at least one bit, the generating step allocating a least significant bit of the plurality of bits as a most significant bit in the magnitude of the random digital signal.

10. The method of claim 1, wherein the selecting step selects at least one bit from the digital sample of a symbol.

11. The method of claim 1, wherein the converting step enables modulation detection by the communications device.

12. A communications device for receiving and decoding an analog electromagnetic signal from a communications media, comprising:
   a receiver;
   an A/D converter having an analog input and a digital output and converting the analog signal to a digital sample at a conversion rate, the analog input being coupled to the receiver, a magnitude of the received analog signal changing at a received rate; and
   a random signal generator coupled to the digital output of the A/D converter, the random signal generator selecting at least one bit from the digital sample at a selection rate and generating a random digital signal having a magnitude corresponding to the at least one bit.

13. The communications device of claim 12, further comprising means coupled to the random signal generator for delaying access to the communications media for the communications device by a time period corresponding to the random digital signal.

14. The communications device of claim 12, wherein the random signal generator designates the at least one bit as the magnitude of the random digital signal.

15. The communications device of claim 12, wherein the random signal generator concatenates the at least one bit with bits from a plurality of the digital samples as the magnitude of the random digital signal.

16. The communications device of claim 15, wherein the concatenated bits are least significant bits of the plurality of the digital samples.

17. The communications device of claim 12, wherein the random signal generator selects a least significant bit of the digital sample as the at least one bit.

18. The communications device of claim 12, wherein the at least one bit is a plurality of bits, the random signal generator allocating a least significant bit of the plurality of bits as a most significant bit in the random digital signal.

19. The communications device of claim 12, wherein the A/D converter enables modulation detection by the communications device.

20. A low-power random signal generator, comprising:
   an A/D converter having an analog input and a digital output and converting repetitively a received analog signal to a digital sample at a conversion rate, a magnitude of the received analog signal changing at a received rate; and selection and generation means coupled to the digital output of the A/D converter for selecting at least one bit from the digital sample at a selection rate and generating a random digital signal having a magnitude corresponding to the at least one bit, the received rate and the conversion rate exceeding the selection rate.

21. The low-power random signal generator of claim 20, wherein the selection and generation means designates the at least one bit as the magnitude of the random digital signal.

22. The low-power random signal generator of claim 20, wherein the selection and generation means concatenates the at least one bit with bits from a plurality of the digital samples as the magnitude of the random digital signal.

23. The low-power random signal generator of claim 22, wherein the concatenated bits are least significant bits of the plurality of the digital samples.

24. The low-power random signal generator of claim 20, wherein the at least one bit is a plurality of bits, the selection and generation means allocating a least significant bit of the plurality of bits as a most significant bit in the random digital signal.

* * * * *